Figure 1:
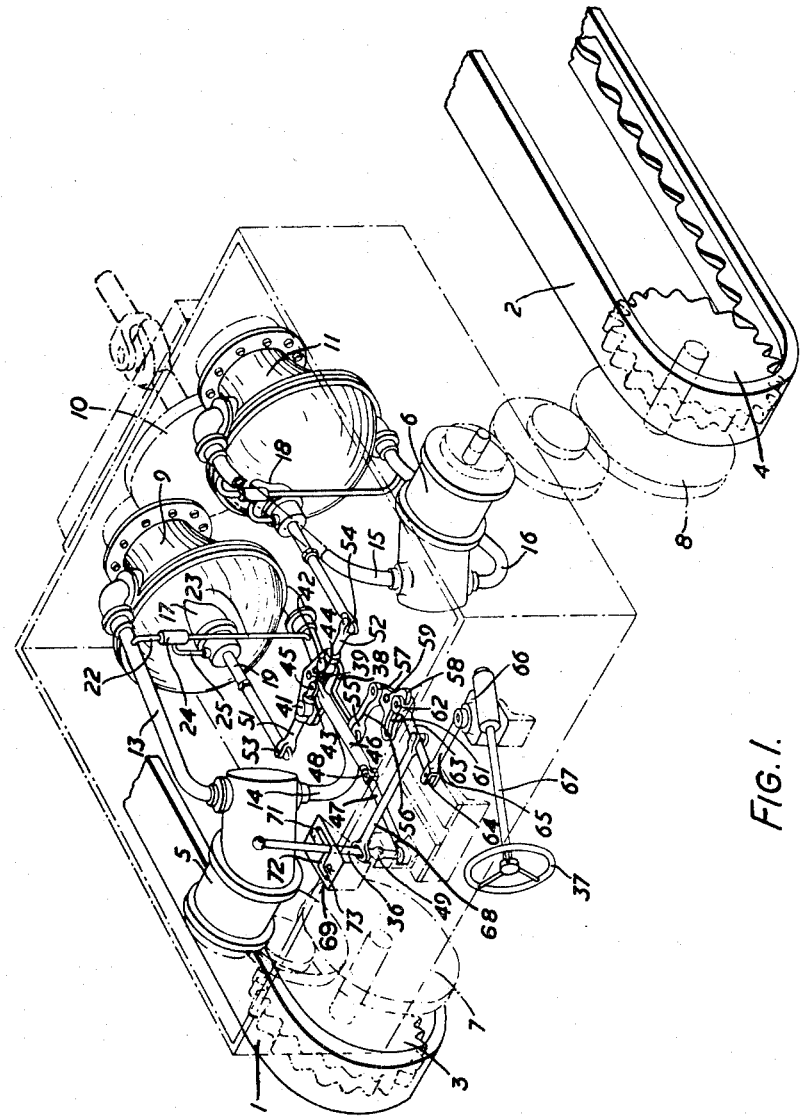

June 21, 1960  E. H. BOWERS ET AL  2,941,609
STEERING OF TRACKED VEHICLES
Filed July 8, 1957  5 Sheets-Sheet 1

INVENTORS
Eric H. Bowers
and Oswald Thoma
BY
ATTORNEYS

United States Patent Office 2,941,609
Patented June 21, 1960

2,941,609

STEERING OF TRACKED VEHICLES

Eric H. Bowers, Cheltenham, England, and Oswald Thoma, Grunwald uber Munich, Germany, assignors, by direct and mesne assignments, to Dowty Hydraulic Units Limited, Tewkesbury, England Filed July 8, 1957, Ser. No. 670,611

Claims priority, application Great Britain July 9, 1956

12 Claims. (Cl. 180—6.48)

This invention relates to the steering of vehicles by differential variation of the driving speed of the ground engaging elements and to the provision of an infinitely variable geared drive for such vehicles. An example of the vehicle to which the invention applies is that in which the vehicle body is supported on the ground and is driven by a pair of endless flexible tracks disposed one on each side of the vehicle and secured to the vehicle by means of a plurality of wheels or the equivalent. The steering of vehicles by differential variation of the driving speed of the ground engaging elements is normally carried out by a system of controllably braking one or other elements and possesses the disadvantage of not giving very accurate steering control of the vehicle during turning. Further, steering in this way does not easily lend itself to the provision of a simple steering control such as a steering wheel.

The main object of this invention is to provide a combined steering and infinitely variable geared drive system for a vehicle in which braking of the ground engaging elements for steering is eliminated and in which highly accurate steering is possible. A further object is to provide such a combined system having a steering wheel which may be operated for steering in the same sense that a steering wheel is operated to steer an ordinary vehicle having steerable ground engaging wheels.

In accordance with the present invention, a vehicle includes a pair of ground engaging elements spaced laterally of the direction of movement, a hydraulic motor to drive each ground engaging element, engine-driven pump means to supply hydraulic pressure liquid to the motors, a rotational speed control for each motor and interlinking means for these controls to act on them oppositely to effect steering and similarly to vary gear ratio. Preferably, each hydraulic motor is of fixed displacement and an engine-driven pump of variable displacement is provided to drive each motor, the speed control being the displacement controls of the pumps. The interlinking means may comprise a lever arrangement movable in two modes to effect differential movement of the displacement controls or similar movement of the displacement controls. The manual means to operate this interlinking means may comprise a single member movable in two modes or, alternatively, two separate members, one for gear selection and one for steering. Where the displacement of the pumps is reversible in order to obtain reverse movement of the vehicle it is desirable that a reversing device should be interconnected between the manual steering member and the interlinking means to reverse the differential operation thereof during steering so that operation of the manual member resembles more closely the steering of an ordinary road vehicle having steerable road wheels.

Figure 2:
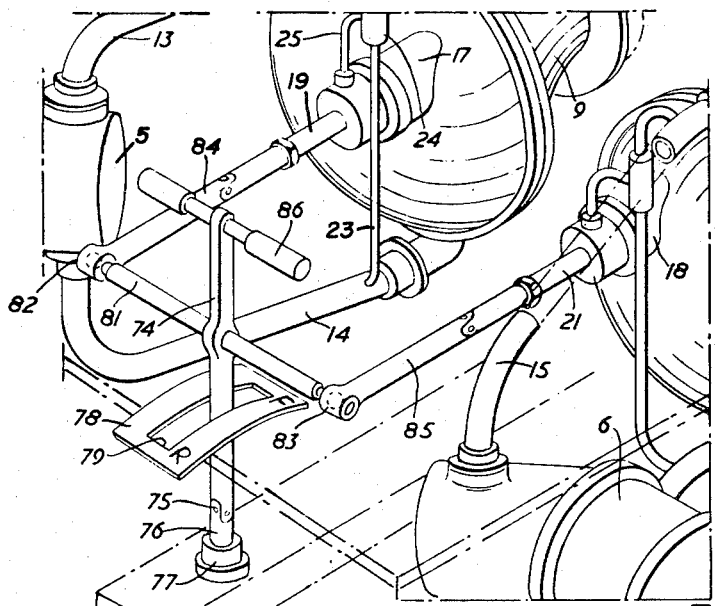
Figure 3:
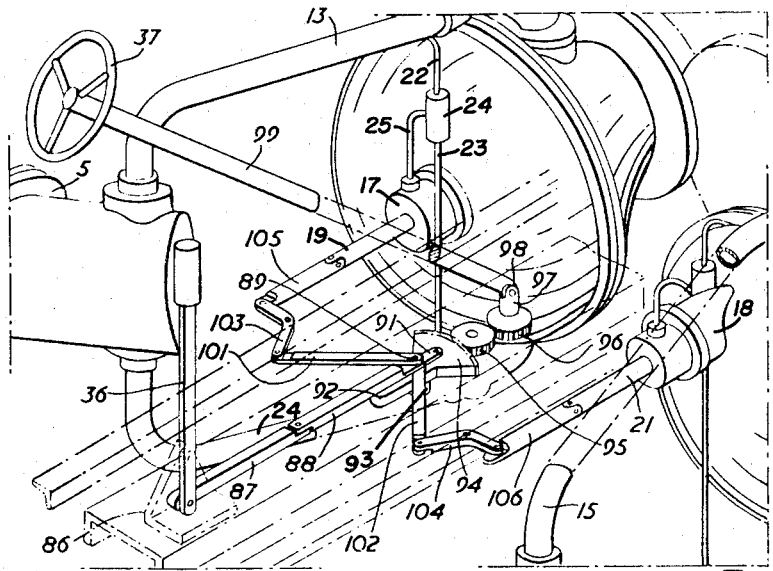
Figure 4:
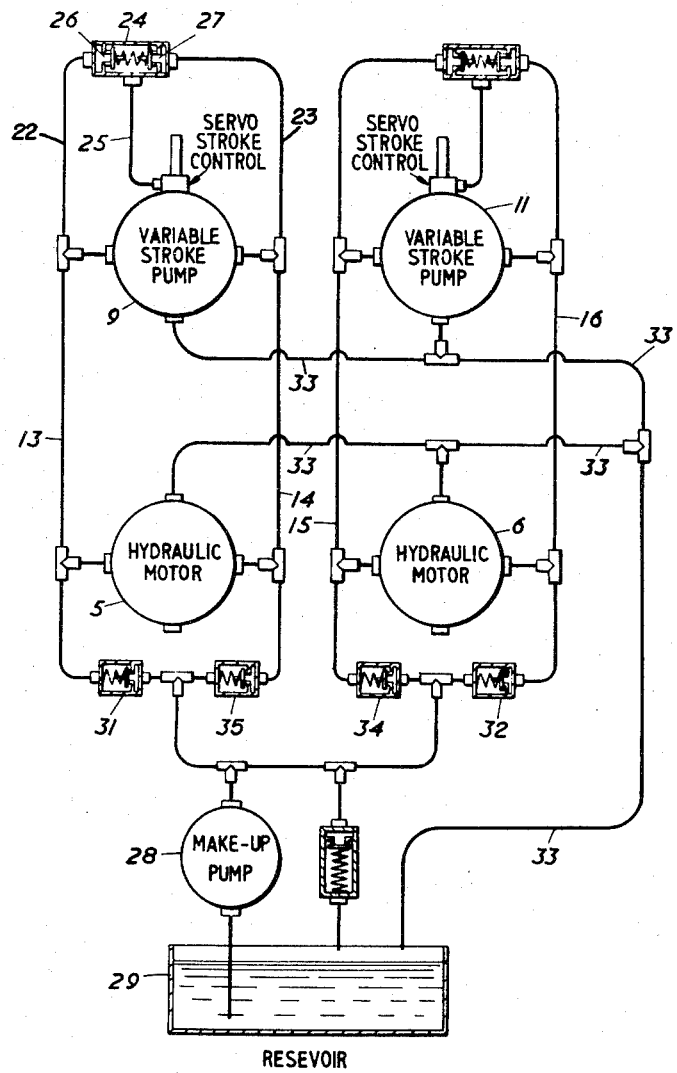
Figure 5:
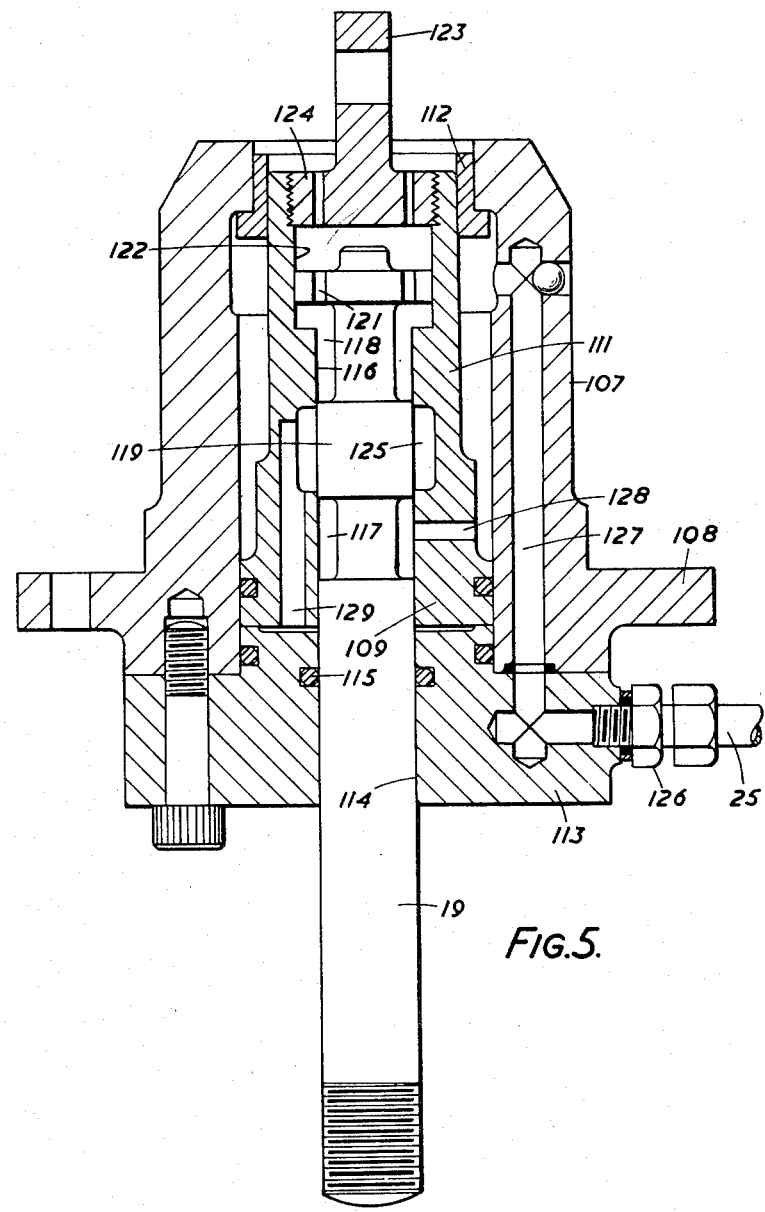
Figure 6:
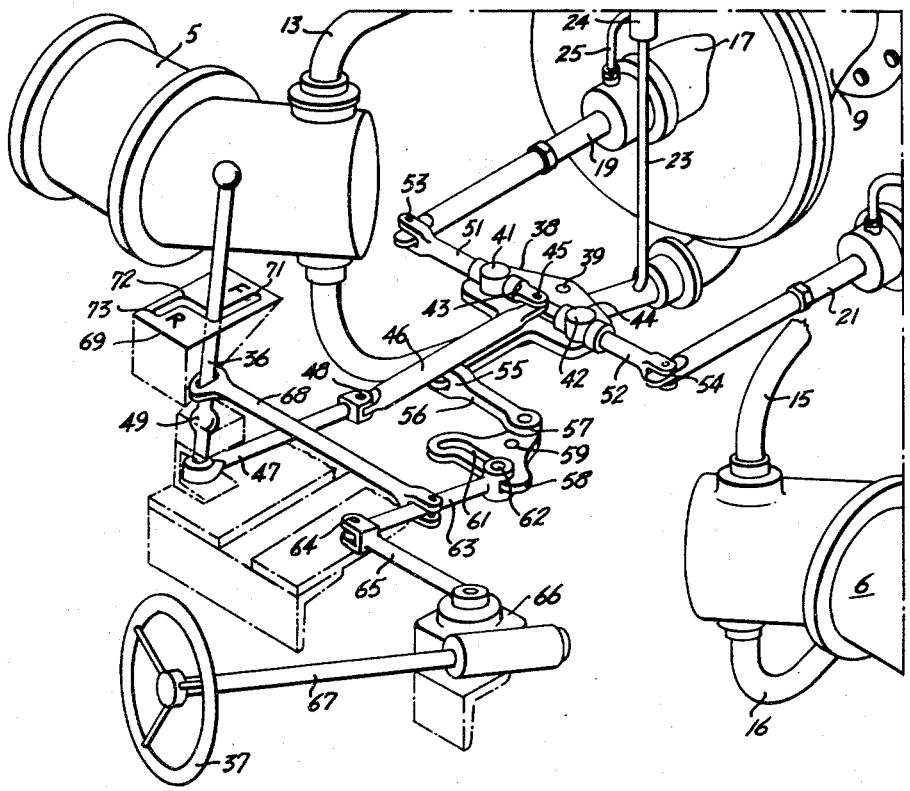

In order that the invention may be clearly understood three embodiments thereof as applied to tracked vehicles will be described with reference to the accompanying drawings, in which:

Figure 1 is a diagrammatic representation in perspective of the first embodiment, Figure 2 is a diagrammatic representation in perspective of the second embodiment, Figure 3 is a diagrammatic representation in perspective of the third embodiment, Figure 4 is a hydraulic circuit diagram applicable to any of Figures 1, 2 or 3, Figure 5 is a cross-sectional drawing of a servo control as used in Figures 1, 2 or 3 for control of pump displacement, and Figure 6 is a view similar to Figure 1, but showing the control linkage on a larger scale.

Referring initially to Figure 1, the endless tracks are indicated at 1 and 2, each track being driven by a rotary gear wheel respectively 3 and 4. Each of the wheels 3 and 4 is driven by a hydraulic motor respectively 5 and 6, both of these motors being of the fixed displacement type, i.e. the quantity of liquid passed for one rotation of the motor is the same under all conditions of operation. Intermediate gearing generally indicated at 7 and 8 interconnects respectively the motor 5 with the driving gear 3 and the motor 6 with the driving gear 4. The hydraulic supplies for these two motors are obtained from two independent variable displacement pumps 9 and 11, the pump 9 supplying pressure liquid solely to the motor 5 and the pump 11 supplying pressure liquid solely to the motor 6 for which purpose a pair of large diameter pipes 13 and 14 interconnect pump 9 with motor 5 and a further pair of large diameter pipes 15 and 16 interconnect the pump 11 and the motor 6. The pumps 9 and 11 are preferably of the type disclosed in our co-pending application No. 657,684, filed May 7, 1957. These pumps are driven from a single prime mover such as an internal combustion engine by means of a single gear wheel 10 driving a gear wheel on each pump. By this means the pumps although hydraulically independent are mechanically connected so that their relative outputs depend entirely on their displacements. For controlling the displacement of pumps 9 and 11 a pair of servo controls 17 and 18 respectively are provided. Each servo control is secured into its pump casing and it operates to alter the angular disposition of the rotating cylinder block about a fixed hinge axis, as will be described later in this specification. Externally of the pump casing a control valve rod respectively 19 and 21 for the servo units 17 and 18 is located. The servo units 17 and 18 receive hydraulic power from the pressure output of their respective pumps and this is obtained by means of a pair of pipes connected across the pump output pipes. To simplify the description reference will be made to the servo supply pressure for the pump 9 only. Here a pair of pipes 22 and 23 extend respectively from the pipes 13 and 14 terminating in a valve casing 24. From the valve casing 24 a pipe 25 extends to the servo control 17. Interiorly of the casing 24 a pair of non-return valves 26 and 27 are located as shown in Figure 4. These non-return valves are so arranged that liquid from the pipe 22 or 23 which is at the higher pressure will be admitted to pipe 25, the valve 26 or 27 connecting to the pipe at lower pressure being held closed by the higher pressure in the other pipe to prevent a short circuit between pipes 13 and 14. For the purpose of maintaining the pumps and motors and their connecting pipes primed with liquid a further engine-driven pump 28 is provided which withdraws hydraulic liquid from a reservoir 29 and delivers it at a comparatively low pressure to the two circuits which comprise the pump 9 and the motor 5 and the pump 11 and motor 6. The supply to the first-mentioned circuit is taken through a pair of non-return valves 31 and 32 connected respectively to the pipes 13 and 14, the arrangement being that whichever of the pipes 13 or 14 is at higher pressure the corresponding non-return valves will be closed whilst liquid may flow through the other non-return valve into the pipe 13 or 14 at lower pressure and thus maintain the whole circuit full of liquid. The leakages which can take place in the two circuits are confined entirely within the casings of the pumps and motors and accordingly a connection is taken from the casing of each of the pumps 9 and 11 and each of the motors 5 and 6 back to the reservoir 29. All of these pipes leading to the reservoir have the reference 33. The second-mentioned circuit including pump 11 and motor 6 is maintained primed with liquid through the non-return valves 34 and 35 in a similar manner to that described for the first-mentioned circuit. When the whole system is in operation movement of either of the control rods 19 or 21 will adjust the displacement of the respective pumps and cause a corresponding feed of pressure liquid to the associated hydraulic motor.

The hydraulic circuit so far described is common to both of the embodiments of Figures 1 and 2. Referring now particularly to Figure 1, a mechanism is provided which is manually controlled through a gear lever 36 and a steering wheel 37 to effect opposite or similar movements of the control rods 19 or 21. This mechanism is carried by a T-shaped lever 38 mounted at a fixed position on the chassis of the vehicle by a pivot 39. At the two ends of the cross limb of this lever two further pivot points 41 and 42 are provided in which a pair of tubular levers respectively 43 and 44 are mounted. These levers are joined together at their inner ends by a pivot 45 to which link 46 is also connected. From link 46 a further link 47 extends through a pivot connection 48 and is connected to the lower end of the gear lever 36. The gear lever 36 is itself supported by means of a ball joint 49. Thus, movement of the lever 36 will move the links 46 and 47 to alter the angular disposition of the levers 43 and 44. Within the ends of tubular levers 43 and 44 two extensions 51 and 52 are slidably mounted being connected at their ends by pivot joints 53 and 54 to the servo control rods 19 and 21. The single limb of the T-shaped lever 38 terminates in a pivot joint 55 to a link 56. The opposite end of the link 56 is pivoted at 57 to the free end of the single limb of a further T-shaped lever 58 which is pivoted at a fixed position 59. The cross limb of lever 58 includes a slot 61 extending from end to end in which the pivot pin 62 of lever 63 is slidably located. Lever 63 is pivotally connected at its opposite end by pivot 64 to a steering arm 65 extending from a steering box 66. This steering box comprises a reduction gearing driven by a shaft 67 extending from the steering wheel 37. A link 68 interconnects the gear lever 36 and the lever 63 whereby movement of lever 36 about the ball joint 49 transversely will cause movement of the pin 62 in the slot 61. The lever 36 is constrained to move in a particular path by means of a slotted plate 69, the slot being formed in three parts 71, 72 and 73. The part 72 of the slot is transversely arranged and is so located to ensure zero translational movements of the vehicle. The slots 71 and 73 extend from opposite ends of slot 72 and movement of lever 36 in slot 71 causes forward translational movement of the vehicle and movement in slot 73 will cause rearwards translational movement.

When the arrangement so described is in use for forward movements in a straight line the gear lever 36 is pushed forwardly along slot 71 whilst the steering wheel 37 is retained in a central position. Location of the steering wheel in its central position ensures a central arrangement of the T-shaped lever 38 and a symmetrical arrangement of the levers 43 and 44 whereby the servo rods 19 and 21 are pushed into the servo controls a similar amount to cause similar pump displacements in pumps 9 and 11. Whilst going forwardly suppose it is desired to turn to the right then the steering wheel 37 is rotated in a clockwise direction. This will cause lever 65 to move forwardly in turn moving lever 63 forwardly, rotating lever 58 in an anti-clockwise direction, moving link 56 to the left, moving lever 38 in a clockwise direction and moving forwardly lever 51 and rod 19. Movement of the lever 38 will also cause rearward movement of lever 52 and rod 21. In this way the displacement of pump 9 is increased and the displacement of pump 11 is decreased causing the track 1 to be moved at a greater forward speed than the track 2 whereby the vehicle will move in a curved path. For turning to the left the steering wheel 37 is rotated in an anti-clockwise direction and the opposite action will take place. When the vehicle is brought to rest, which is normally accomplished by pulling lever 36 back to the neutral position in slot 72, the rods 19 and 21 are both pulled out to the zero displacement positions in which the pumps 9 and 11 may rotate without displacing liquid. In the neutral position with the lever at the common end of slots 71 and 72 then clockwise rotation of steering wheel 37 will cause rod 19 to be pushed inwardly and rod 21 to be pulled outwardly thus giving a forward motion to track 1 and a rearward motion to track 2 so that the whole vehicle will move angularly about a central vertical axis without any backward or forward translational movement. When it is desired to move the vehicle in reverse the gear lever 36 is moved through the slot 72 into the slot 73, the amount of movement into slot 73 determining the amount which the control rods 19 and 21 are pulled outwardly and thus determining the displacement of the pumps in the reverse sense. In moving the lever 36 into the reverse position it is necessarily moved sideways through slot 72 and such movement is transferred through link 68 to lever 63 to cause the pivot 62 to slide to the opposite (left) end of slot 61. In this way the sense of the movement given by lever 65 is reversed from that previously described in the differential operation of the rods 19 and 21. This reversal is necessary because of the fact that without such reversal adjustment of the steering wheel in a particular direction will cause the same sense of differential operation of the rods 19 and 21 and with the result that whatever the direction of movement imparted to the vehicle the turning movement would be in the same angular sense. It will be seen that if the vehicle when going forward is moving along a curved path the angular turning movement involved if applied to the vehicle when travelling in reverse will result in the vehicle moving along a path of opposite curvature. The lateral movement given to lever 36 when moving through slot 72 reverses the steering sense when a reverse gear is being selected so that for a particular sense of turning of the steering wheel the curvature of the path along which the vehicle travels will be the same where forward or reverse gear is selected.

Referring now to Figure 2, the arrangement shown is operated with the same basic arrangement of pumps 9 and 11, motors 5 and 6, tracks 1 and 2 with geared drives and the hydraulic circuit arrangement as shown in Figure 5. The arrangement shown in this figure for obtaining steering and gear selection is considerably simplified from that shown in Figure 1 from the constructional point of view although from the point of view of the driver it would need slightly more skill in its operation. In this embodiment the steering and gear selection controls are unified into one manual control member which comprises a lever 74 carried by a universal joint 75 on a stub axle 76 rotatably mounted in a socket 77 attached to the vehicle chassis. At a distance from the universal joint 75 a guide plate 78 is secured to the vehicle chassis having a slot 79 in which the lever 74 may move in a backwards and forwards direction. A spring-loaded friction means (not shown but common in like control lever mounts) may be secured to the lever where it engages the slot 79 to frictionally locate the lever at any selected position. Above the plate 78 a transverse lever 81 is fixedly secured to the lever 74 extending on both sides thereof. At the ends of lever 81 ball joints 82 and 83 are located from which links 84 and 85 extend to the control rods 19 and 21. At the upper end of the lever 74 a transverse handle 86 is secured.

In operation, if it is desired to move the vehicle forwardly the lever 74 is pushed forwardly by means of the handle 86 without imparting rotation to the lever whereby the control rods 19 and 21 are pushed into their respective servos 17 and 18 to cause similar increases in the displacements of pumps 9 and 11 thus causing the motors 5 and 6 to drive the two tracks similarly in the forward direction. If, whilst travelling forwardly, it is desired to turn to the right the lever 74 is rotated on its axis by means of the handles 86 whereby the control rod 19 is pushed slightly further into its servo and the control rod 21 is withdrawn slightly from its servo. In this way the displacement of pump 9 is increased whilst the displacement of pump 11 is decreased whereby the track 1 is driven at a greater forward speed than the track 2. Thus, the vehicle will move along a curved path. For turning to the left the lever 74 will be rotated oppositely. To stop the vehicle the lever 74 is moved backwards to the central position in slot 79 when the displacement of both pumps is reduced to zero thus stopping movement of both tracks. In this neutral position it is possible by turning the lever 74 on its axis to the right to cause the track 1 to move forwardly and the track 2 to move backwardly at an equal rate so that the vehicle will move in a clockwise sense about a central vertical axis. Similarly if the lever 74 is rotated in the opposite direction about its axis, the vehicle will then rotate in an anti-clockwise direction about a central vertical axis. In both of these operations there will be no translational movement of the vehicle. To move the vehicle in reverse the lever 74 is moved backwardly so that the control rods 19 and 21 are both pulled outwardly to an equal extent from their servos. In this way the displacement of pumps 9 and 11 are reversed to an equal extent and the tracks 1 and 2 are driven equally in the reverse direction so that the vehicle will proceed backwardly in a straight line. If it is desired to turn when driving backwardly the driver must bear in mind that if he requires to travel along a particular curved path the angular movement which he must apply to lever 74 to travel along that path in reverse is the opposite to the angular movement which he would apply to travel along the same path in the forward direction. The reason for this is that rotation of lever 74 about its axis imparts a rotation in the same sense to the vehicle about a central vertical axis whether or not the vehicle is travelling forwardly or rearwardly. If the vehicle is to travel along a particular curved path then when travelling forwardly along the path the rate of turn about the vertical axis is in a certain sense, but when travelling backwardly along the same path the rate of turn about the vertical axis must necessarily be in the opposite sense. It will be seen that this method of control is extremely simple both in manufacture and in use, but the sense of operation of the control lever 74 for steering is not exactly similar to the sense of steering that is obtained on an ordinary wheeled vehicle having steerable road engaging wheels.

In the embodiment of the invention shown in Figure 3 an arrangement is shown whereby a steering wheel is provided in which a certain rotation thereof will define accurately the curved path along which the vehicle will travel whether or not the direction of travel is forwardly or rearwardly. It should be mentioned here that in the embodiment of Figure 1 there is the disadvantage that for a particular setting of the steering wheel 37 the curvature of the path travelled will depend inversely on the forward or rearward speed. This is due to the fact that for a given setting of the steering wheel 37 and a given engine speed the steering wheel setting determines the rate of rotation of the vehicle about its central vertical axis, this rate being independent of the forward or rearward speed of the vehicle. In Figure 3 the manual controls are provided separately as a gear lever 36 and steering wheel 37. The gear lever 36 is pivoted by a bracket 86 to the chassis and from the lower end of the lever a pair of pivoted links 87 and 88 extend forwardly. The front end of the link 88 terminates in a pivot pin 89 which engages slidably and rotatably within a slot 91 formed in a lever 92 pivoted to the chassis at 93. The slot 91 extends equally on either side of the pivot 93. At the front end of lever 92 a gear quadrant 94 is formed which is in mesh with an idler pinion 95 pivoted to the chassis. A pinion 96 also pivoted to the chassis meshes with the idler pinion 95 and a spindle 97 extends from pinion 96 connected through a universal joint 98 to a spindle 99 which extends to the steering wheel 37. At the pivot pin 89 a pair of links 101 and 102 are secured which extend on opposite sides, the ends of these links being pivotally secured to bell crank levers 103 and 104 respectively. The bell crank levers are pivoted at their centres to the chassis and the opposite ends are pivoted to rods 105 and 106 which in turn are connected through universal joints to the control rods 19 and 21. The arrangement described is set up so that when the gear lever is in the neutral position the pin 89 is centrally disposed in the slot and is co-axial with the pivot 93.

When in operation, if it is desired to go forwardly, the gear lever 36 is pushed forwardly. This action pulls the pin 89 rearwardly through links 87 and 88, this movement being transmitted through links 101 and 102 and bell cranks 103 and 104 to the control rods 19 and 21. Assuming the steering is set for movement in a straight line equal movements will be applied to the rods 19 and 21 and the tracks 1 and 2 will then move with equal speeds. In order to turn the vehicle, for example to the right, steering wheel 37 is rotated in a clockwise direction. The lever 92 will then also be rotated in a clockwise direction by means of the idler pinion 95 and opposite movements will be applied through links 101 and 102 and the bell cranks 103 and 104 to the control rods 19 and 21, the rod 19 being pushed inwardly slightly and the rod 21 being pulled outwardly slightly. Thus a bigger displacement will be given to the pump 9 and the track 1 will move more quickly than the track 2 so that the vehicle will move in a curve to the right. To bring the vehicle to rest the lever 36 is pulled back to the neutral position pulling the pin 89 towards the centre of slot 91. In so doing the differential movement given to the rods 19 and 21 by movement of the steering wheel 37 will be gradually reduced to zero as the pin 89 approaches the pivot axis 93. Thus, the differential speeds given to the tracks 1 and 2 will reduce as the speed of the vehicle is reduced and by this means it will be seen that the curved path of travel of the vehicle will remain substantially the same as the vehicle slows down to rest. In order to select reverse gear lever 36 is pulled backwardly pushing forwardly the pin 89 and pulling out the control rods 19 and 21. Assuming that the steering wheel 37 still retains its clockwise displacement then as a higher reverse gear is selected the pin 89 will be displaced more to one side with the result that the vehicle will travel backwardly along the same curve that it originally travelled forwardly irrespective of the backwards speed selected. By this means it will be seen that the sense of steering obtained with steering wheel 37 is exactly the same as is obtained in an ordinary wheeled vehicle having steerable road engaging wheels in that the setting of the steering wheel determines the curvature of the path over which the vehicle is to travel whether the movement is forwardly or in reverse. With this arrangement it will be seen that it is not possible to turn the vehicle round on one spot since it is impossible to select any movement without there being a forward or rearward movement involved. However, it is possible, by turning the steering wheel as far as possible in one direction and selecting a very small forward or reverse speed, to cause the vehicle to rotate with one track substantially fixed, and the other track rotating at a comparatively much higher speed. If it is desired to retain in this construction the ability to turn on one spot it is easily possible to arrange an overriding control which operates for example on the links 101 and 102 to operate the control rods 19 and 21 differentially without the necessity of selecting a forward or reverse speed.

Referring now to Figure 5, there is shown a cross-section of the servo control, for example, that at 17, used on the variable displacement pumps 9 and 11. The control 18 is identical. This servo comprises a cylinder 107 extending inwardly from the flange 108 which is secured to the pump casing. Internally of the cylinder 107 piston 109 is slidably mounted from which extends a large diameter piston rod 111 extending in a fluid-tight manner through a bearing 112 at the inner end of cylinder 107. The outer end of cylinder 107 is closed by a cover 113 having a central hole 114 through which extends the control rod 19, a seal 115 preventing leakage of liquid. The control rod extends into a small diameter bore 116 interiorly of the piston rod 111. The rod 19 is recessed at two positions 117 and 118 leaving a single land 119. Movement of the control rod relatively to the piston 109 is limited by the provision of a flange 121 at the end thereof working in a larger bore 122, engagement at either end of this bore forming a positive stop on movement relative to the piston. The end of the piston rod which includes the bore 122 is formed with a lug 123 for connection to the mechanism in the pump, of any suitable nature, for varying the angular disposition of the rotating cylinder block. This lug 123 is conveniently formed as part of a screw-threaded end cap 124 which closes the end of the bore 122. A groove 125 is formed interiorly around bore 116 whose actual length is slightly shorter than that of the land 119, the position being such that in the central position of the control rod relatively to the piston the groove 125 is entirely covered by the land 119. The pressure supply pipe 25 is secured to a pipe connector 126 on the front cover 113 and a passageway 127 passes from this connector along the wall of cylinder 107 opening at the innermost end of the cylinder 107 to feed into the space between the cylinder and the piston rod. A hole 128 passes through the wall of the piston rod 116 and opens into the position 117 of the control rod. A further passage 129 connects the groove 125 to the front face of piston 109. When in operation hydraulic liquid is supplied to the servo through pipe 25, this liquid being fed to the inner side of piston 109. In the equilibrium position of the servo the land 119 will close groove 125 and the liquid in front of piston 109 is trapped in position whilst the inner side of the piston is exposed to the hydraulic pressure from pipe 25 whereby the servo piston is locked in position. In order to move the servo the control rod 19 is moved in the appropriate direction. If the control rod is moved outwardly then the groove 125 is connected through holes in the flange 121 and the plug 124 to the interior of the pump casing which is directly connected to the reservoir. Thus liquid trapped in front of piston 109 is directly vented back to the reservoir and the hydraulic pressure acting on the inner side of the piston will move the piston outwardly until the land 119 again covers the groove 125. If the control rod 19 is moved inwardly then groove 125 is connected through the hole 128 to the hydraulic pressure existing on the inner side of the piston and this pressure is fed through passage 129 to the front side of piston 109. Because the front side of piston 109 has a bigger effective area than the inner side, the piston will move inwardly until the groove 125 is closed by the land 119. In the neutral position of the gear selector control i.e. when the pump displacements are zero then the pressure acting in the pipe 25 is that delivered by the makeup pump 28. Where a forward or a reverse gear is selected the higher pressure delivered by the variable stroke pump is fed through non-return valves 26 or 27 to the pipe 25 thus giving a greater force to the servo. This greater force is necessary since a considerably greater force is necessary to hold the pump at a selected displacement rather than at zero displacement.

Many variations of the described embodiments of the invention are possible within the scope of the invention. For example, the motors themselves may be of variable displacement within limits or alternatively a single pump may be provided together with a variable flow divider to divide the hydraulic liquid in adjustable predetermined proportions between the two motors to effect steering, whilst the delivery of the pump decides the translational speed.

We claim as our invention:

1. Combined steering and speed control mechanism for a vehicle such as has a pair of reversible and independently operable traction members at the respectively opposite sides, said mechanism including a hydraulic motor individual to and arranged for driving connection to each such member, a reversible and infinitely variable pump individual to and operatively connected for delivery to each such motor, hydraulic servo control for each pump and motor combination operable to control the amount and sense of fluid delivery to that motor, a steering control element operable under manual control, and operatively connected to each servo control, and a speed selector element also operable under manual control, and operatively connected to each servo control, a manual control device for each such element, for steering and for speed control, respectively, mechanism operatively connected intermediate each such element and its manual control device, and movable in one mode by the manual steering control device to shift the respective servo controls in the appropriate relative amounts and senses to produce differential speeds of the two motors supplemental to any speed actuation of the servo controls, for steering, and movable in a different mode by the manual speed control device to shift the respective servo controls alike, in the appropriate senses and amounts to produce like variations in speed and sense of the two motors, supplemental to any steering actuation of the servo controls, for regulation of the speed and sense of travel.

2. Combined steering and speed control mechanism of the character set forth in claim 1, wherein the manual steering control device is separate from the manual speed control device, and characterized in that the mechanism intermediate each thereof and the two servo controls includes mechanism for reversing the sense of movement of the servo controls by actuation of the steering control device, arranged for automatic operation by actuation of the speed control device through a zero speed position.

3. Combined steering and speed control mechanism of the character set forth in claim 1, wherein the steering control element is integral with the speed control element, and characterized in that the mechanism intermediate each thereof and the two servo controls includes mechanism for reversing the sense of movement of the servo controls by actuation of the steering control element, arranged for automatic operation by actuation of the speed control element through a zero speed position.

4. Combined steering and speed control mechanism of the character set forth in claim 1, wherein the steering control device includes a manually operable lever shiftable to either side of a neutral position, corresponding to zero delivery of the two pumps, whereby to reverse the steering direction of the mechanism.

5. Combined steering and speed control mechanism of the character set forth in claim 4, wherein the manual speed control device includes a lever shiftable between either of two limit positions, at opposite sides of a neutral position, said lever being operatively connected to the shiftable steering control element, to reverse the latter automatically upon shifting of the speed selector lever through its neutral position.

6. The combination of claim 1, wherein the movement of the steering control element in the steering mode is in proportion to the speed ratio selected by the speed control element, whereby the curved path of travel of the vehicle is independent of the selected speed ratio.

7. Combined steering and speed control mechanism of the character set forth in claim 1, wherein the manual control devices for the steering control element and for the speed selector element, respectively, are integral, and comprise a lever rockable in one mode for speed control, and having a cross arm and means connecting its respective ends to the corresponding servo control, so as to move the cross arms and hence the servo controls both alike, and rotatable in another mode so as to move the cross arms and hence the servo controls in opposite senses, said cross arm and connecting means constituting the operative connections between the steering and the speed control elements and the servo controls.

8. A device of the character described, for driving and steering a vehicle such as has a ground-engaging element at each side, comprising a continuously driven first pump, a rotative first motor for driving connection with one such ground-engaging element, a continuously driven second pump, a rotative second motor for driving connection with the other ground-engaging element, hydraulic pipe connections between the first pump and motor, and between the second pump and motor, variable displacement means acting on each pump to vary infinitely the liquid flow-to-rotation relationship from a positive value through zero to a negative value, whereby each pump and its motor forms an infinitely variable reversible power transmission for driving the respective ground-engaging elements, and a control for the two variable displacement means including a pair of control members themselves operable under control, one such control member being operatively connected to the two variable displacement means for similar operation of the latter, to determine the driving speed ratio of the pumps jointly, while the other such control member is operatively connected to the two variable displacement means to effect differential speeds as between the two pumps, for steering.

9. The combination of claim 8, wherein the control for the two variable displacement means includes a reversing means operable in conjunction with the other of said manually operable members to reverse the direction of differential operation of the variable displacement when the one of said manually operable members is moved through the zero speed position.

10. Combined steering and speed control mechanism for a vehicle having a pair of ground engaging elements spaced laterally of the direction of movement of the vehicle, said mechanism including a separate hydraulic motor for driving connection to each ground engaging element, a variable displacement pump connected to drive each motor, a displacement control for each pump, a lever assembly interlinking the displacement controls and arranged for movement in one mode whereby the controls are moved oppositely for vehicle steering and in another mode whereby the controls are moved similarly to adjust gear ratio for translational movement, a manual steering element connected to move the lever assembly in the steering mode and a manual gear selecting element arranged to move the lever assembly in the gear adjustment mode, the displacement controls being arranged for parallel movement and the lever assembly comprising a first lever fixedly pivoted at its center, a second lever pivotally and slidably mounted at one end of the first lever, a third lever pivotally and slidably mounted at the other end of the first lever, a first link extending from the manual gear adjustment element and pivotally connected to the inner ends of the second and third levers, a pivotal connection from the outer end of the second lever to one displacement control, a pivotal connection from the outer end of the third lever to the other displacement control and a second link extending from the manual steering element and pivotally connected to the first lever whereby movement of the first link for gear adjustment causes similar movement of the displacement controls and movement of the second link causes opposite movements of the displacement controls.

11. The combination of claim 10, wherein a reversing lever is included in the second link together with operating means for the reversing lever controlled by movement of the gear adjustment element through the neutral position whereby the sense of steering is maintained the same for forward and reverse adjustment of the gear.

12. Combined steering and speed control mechanism for a vehicle having a pair of ground engaging elements spaced laterally of the direction of movement of the vehicle, said mechanism including a separate hydraulic motor for driving connection to each ground engaging element, a variable displacement pump connected to drive each motor, a displacement control for each pump, a lever assembly interlinking the displacement controls and arranged for movement in one mode whereby the controls are moved oppositely for vehicle steering and in another mode whereby the controls are moved similarly to adjust gear ratio for translational movement, a manual steering element connected to move the lever assembly in the steering mode and a manual gear selecting element arranged to move the lever assembly in the gear adjustment mode, said lever assembly comprising a first lever fixedly pivoted at its centre and having a slot extending along its length, a pin slidable in the slot, a first link pivotally carrying said pin in the slot and extending to the gear adjustment element, a second and a third link extending pivotally from the pin on opposite sides of the first lever and connected respectively to the displacement controls, and a rotary mechanical drive to the first link extending from the manual steering element whereby movement of the gear adjustment element causes sliding movement of the pin along the slot to apply similar movements to the displacement controls and movement of the steering element causes rotary movement of the first lever to apply opposite movements to the displacement controls, the magnitude of these opposite movements being proportional to the displacement of the pin from the fulcrum of the first lever whereby the curvature of the path of travel of the vehicle will not depend on the selected gear.

References Cited in the file of this patent

UNITED STATES PATENTS

| | | |
|---|---|---|
| 2,227,696 | Blaylock | Jan. 7, 1941 |
| 2,359,758 | Hamren | Oct. 10, 1944 |
| 2,393,324 | Joy | Jan. 22, 1946 |
| 2,407,322 | Morrison | Sept. 10, 1946 |
| 2,446,242 | Orshansky | Aug. 3, 1948 |
| 2,704,131 | Vahs | Mar. 15, 1955 |

FOREIGN PATENTS

| | | |
|---|---|---|
| 611 | Great Britain | Nov. 12, 1903 |